United States Patent
Zeng et al.

(10) Patent No.: US 12,391,618 B2
(45) Date of Patent: Aug. 19, 2025

(54) METHOD FOR PREPARING INFRARED RADIATION CERAMIC MATERIAL

(71) Applicants: Yunnan Huapu quantum Material Co., Ltd, Yunnan (CN); ROI Optoelectronics Technology CO, LTD., Shanghai (CN); Chongqing Institute of East China Normal University, Chongqing (CN); East China Normal University, Shanghai (CN)

(72) Inventors: Heping Zeng, Chongqing (CN); Mengyun Hu, Chongqing (CN); Shencheng Shi, Chongqing (CN)

(73) Assignees: YUNNAN HUAPU QUANTUM MATERIAL CO., LTD, Yunnan (CN); ROI OPTOELECTRONICS TECHNOLOGY CO, LTD., Shanghai (CN); CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 819 days.

(21) Appl. No.: 17/703,052

(22) Filed: Mar. 24, 2022

(65) Prior Publication Data
US 2022/0306540 A1    Sep. 29, 2022

(30) Foreign Application Priority Data
Mar. 24, 2021 (CN) .......................... 202110310159.3

(51) Int. Cl.
C04B 35/00 (2006.01)
C04B 35/26 (2006.01)
C04B 35/645 (2006.01)
C04B 35/65 (2006.01)
C04B 35/66 (2006.01)
C04B 35/74 (2006.01)
(Continued)

(52) U.S. Cl.
CPC .......... *C04B 35/265* (2013.01); *C04B 35/645* (2013.01); *C04B 41/0036* (2013.01); (Continued)

(58) Field of Classification Search
None
See application file for complete search history.

(56) References Cited

U.S. PATENT DOCUMENTS

| 2019/0054653 A1* | 2/2019 | Kimura | C04B 35/10 |
| 2019/0389776 A1* | 12/2019 | Villalobos | C04B 41/009 |
| 2023/0191652 A1* | 6/2023 | Kimura | C04B 35/64 |
| | | | 264/497 |

FOREIGN PATENT DOCUMENTS

| CN | 101353251 A | * | 1/2009 |
| CN | 102910898 A | * | 2/2013 |

(Continued)

OTHER PUBLICATIONS

Sadek, H.E.H., Zawrah, M.F., Khattab, R.M. et al. Effect of CuO, NiO, MnO2 and sintering temperature on the formation of cordierite-spinel composites processed by direct coagulation casting. J Mater Sci: Mater Electron 34, 1196 (2023). https://doi.org/10.1007/s10854-023-10594-5 (Year: 2023).*

(Continued)

*Primary Examiner* — Alison L Hindenlang
*Assistant Examiner* — Andres E. Behrens, Jr.
(74) *Attorney, Agent, or Firm* — Hodgson Russ LLP

(57) ABSTRACT

A method for preparing an infrared radiation ceramic material includes mixing and ball milling raw materials of $Fe_2O_3$, $MnO_2$ and CuO in a mass ratio to obtain a mixed powder; pressing the mixed powder; adjusting laser spot, laser power and laser sintering time of a laser; irradiating or sintering by a first laser the pressed mixed powder in a crucible for a high-temperature solid-phase reaction to obtain an $AB_2$ (Continued)

$O_4$ type ferrite powder; obtaining a first mixture by mixing the $AB_2O_4$ type ferrite powder and a cordierite powder in a mass ratio; adding a sintering aid and a nucleating agent for ball milling; obtaining a second mixture by mixing the first mixture and a binder for aging; pressing the second mixture; and irradiating or sintering the pressed second mixture by a second laser to obtain the infrared radiation ceramic material.

20 Claims, 2 Drawing Sheets

(51) Int. Cl.
*C04B 41/00* (2006.01)
*C04B 35/626* (2006.01)

(52) U.S. Cl.
CPC ...... *C04B 41/0063* (2013.01); *C04B 35/6261* (2013.01); *C04B 2235/3267* (2013.01); *C04B 2235/3274* (2013.01); *C04B 2235/3281* (2013.01); *C04B 2235/5436* (2013.01); *C04B 2235/5445* (2013.01); *C04B 2235/658* (2013.01); *C04B 2235/665* (2013.01)

(56) References Cited

FOREIGN PATENT DOCUMENTS

| CN | 103253713 | A | * | 8/2013 | |
|---|---|---|---|---|---|
| CN | 102910898 | B | * | 1/2014 | |
| CN | 107793141 | A | * | 3/2018 | ........... C04B 35/195 |
| CN | 108892177 | A | | 11/2018 | |
| CN | 108947512 | A | | 12/2018 | |
| CN | 109095911 | A | | 12/2018 | |

OTHER PUBLICATIONS

CN-107793141-A (Zhang) Mar. 2018 (online machine translation), [Retrieved on Apr. 14, 2025]. Retrieved from: Espacenet (Year: 2018).*
CN-102910898-B (Xi) Jan. 2014 (online machine translation), [Retrieved on Apr. 14, 2025]. Retrieved from: Espacenet (Year: 2014).*
CN-102910898-A (Xi) Feb. 2013 (online machine translation), [Retrieved on Apr. 14, 2025]. Retrieved from: Espacenet (Year: 2013).*
CN-103253713-A (Gao) Aug. 2013 (online machine translation), [Retrieved on Apr. 14, 2025]. Retrieved from: Espacenet (Year: 2013).*
CN-101353251-A (Zhang) Jan. 2009 (online machine translation), [Retrieved on Apr. 14, 2025]. Retrieved from: Espacenet (Year: 2009).*
A high-performance ternary ferrite-spinel material for hydrogen storage via chemical looping redox cycles, 2020 Dewang Zeng https://doi.org/10.1016/j.ijhydene.2019.11.021 (Year: 2020).*
CNIPA, First Office Action for CN Application No. 202110310159. 3, May 26, 2022.
CNIPA, Second Office Action for CN Application No. 202110310159. 3, Sep. 21, 2022.

* cited by examiner

METHOD FOR PREPARING INFRARED RADIATION CERAMIC MATERIAL

CROSS-REFERENCE TO RELATED APPLICATION

This application claims priority to Chinese Patent Application No. 202110310159.3, filed on Mar. 24, 2021, the entire contents of which is incorporated herein by reference.

FIELD

The present disclosure relates to a technical field of an infrared luminous ceramic material, and more particularly to a method for preparing an infrared radiation ceramic material.

BACKGROUND

An infrared radiation ceramic material is generally used in a high temperature environment provided by a heat source, which cannot meet utilizing demands at room temperature. A room-temperature infrared radiation ceramic material has high photothermal conversion efficiency at room temperature, does not need a heat source, and may absorb heat of surrounding environment, which may be used for various fields, such as a household ceramic field and an architectural ceramic field.

Since the 1990s, the high temperature infrared radiation materials are investigated and developed. In 1992, Zechun Jiang and others from the Institute of Geochemistry, Chinese Academy of Sciences studied thermal radiation properties of spinel minerals, and pointed out that iron spinel minerals have the highest emissivity among spinel minerals. A spinel-type ferrite ($AB_2O_4$ type) has good spectrally selective absorption properties, and may be used as a potential absorption coating in solar thermal collection systems. A transition metal oxide has a large thermal expansion coefficient, such that the spinel-type ferrite needs to be compounded with a material with a small thermal expansion coefficient to decrease the thermal expansion coefficient.

Cordierite ($2MgO.2Al_2O_3.5SiO_2$), one of silicate mineral materials, has excellent infrared radiation properties, a loose ion arrangement, a lattice with a large cavity, a loose structure, a good thermal stability, a high heat resistance, a thermal shock resistance, and a low thermal expansion coefficient. The ions such as $Mg^{2+}$ contained in the cordierite are easily replaced by transition metal ions, resulting in lattice distortion, thereby improving infrared radiation performance.

The spinel-type ferrite may be compounded with the cordierite to obtain an infrared radiation material with high visible light absorption. The infrared radiation materials are generally prepared by liquid-phase methods or solid-phase methods. Chinese Patent Application No. 201810982843.4 discloses a method for preparing ceramic powder by a solution-gel method. The obtained ceramic powder has small particles, but the method has low preparation efficiency and high cost. Chinese Patent Application No. 201810983537.2 discloses a solid-phase sintering method, which is basically the same as a traditional method for preparing a ceramic material, and has simple process flow. However, the product particles are large and the infrared emission performance is poor.

SUMMARY

In an aspect, embodiments of the present disclosure provide a method for preparing an infrared radiation ceramic material. The method includes:

mixing and ball milling raw materials of $Fe_2O_3$, $MnO_2$ and CuO in a mass ratio of x:(9-y):y to obtain a mixed powder, where $0<x<9$, and $0<y<9$;

pressing the mixed powder;

irradiating or sintering by a first laser with a first irradiating parameter the pressed mixed powder in a first copper crucible for a high-temperature solid-phase reaction to obtain an $AB_2O_4$ type ferrite powder;

obtaining a first mixture by mixing the $AB_2O_4$ type ferrite powder and a cordierite powder in a mass ratio of m:(100-m), where $0 \leq m \leq 100$, and adding 0 to 5% of a sintering aid and a nucleating agent based on a total mass percent of the infrared radiation ceramic material for ball milling;

obtaining a second mixture by mixing the first mixture with 1% to 5% of a binder based on the total mass percent of the infrared radiation ceramic material for aging for 10 h or more;

pressing the second mixture;

irradiating or sintering by a second laser with a second irradiating parameter the pressed second mixture in a second copper crucible for a high-temperature solid-phase reaction to obtain the infrared radiation ceramic material.

Each of the first irradiating parameter and the second irradiating parameter includes at least one of laser spot, laser power and laser sintering time.

In some embodiments of the present disclosure, the method further includes drying the raw materials of $Fe_2O_3$, $MnO_2$ and CuO at a temperature of 75° C. to 85° C. for 2 h or more. The mass ratio of $Fe_2O_3$, $MnO_2$ and CuO is such that the mixed powder includes one or more of $MnFe_2O_4$, $CuFe_2O_4$, $CuMn_2O_4$, $FeFe_2O_4$ and $FeMn_2O_4$.

In some embodiments of the present disclosure, mixing and ball milling raw materials of $Fe_2O_3$, $MnO_2$ and CuO in a mass ratio of x:(9-y):y to obtain the mixed powder includes:

dry ball milling the raw materials to obtain the mixed powder.

In alternative embodiments of the present disclosure, mixing and ball milling raw materials of $Fe_2O_3$, $MnO_2$ and CuO in a mass ratio of x:(9-y):y to obtain the mixed powder includes:

wet ball milling the raw materials with anhydrous ethanol, n-heptane, acetone or deionized water as a medium for 5 h or more in a ball milling tank, wherein a volume of the raw materials is not more than two thirds of a volume of the ball milling tank;

drying the ball milled materials at a temperature of 75° C. to 85° C. for 3 h or more to obtain the mixed powder; and grinding the mixed powder evenly.

In some embodiments of the present disclosure, ball milling is performed by a ball mill at a milling speed of 300 to 600 r/min, and a mass ratio of a milling ball to powders is 10:1 to 60:1.

In some embodiments of the present disclosure, the binder includes one or more of polyvinyl alcohol, methyl cellulose, polyhedral silsesquioxane, water glass, W-6C powder molding glue, hyperborosilicate, methoxysilane, polyurethane and silicone.

In some embodiments of the present disclosure, each of the sintering aid and the nucleating agent includes one or more of $TiO_2$, TiC, ZnO, $CeO_2$, and $ZrO_2$.

In some embodiments of the present disclosure, pressing is performed by hydraulic pressing at a pressure of 2 MPa to 15 MPa for 3 s to 10 s, or by isostatic pressing at a pressure of 100 MPa to 300 MPa for 3 s to 10 s.

In some embodiments of the present disclosure, the method further includes: removing the binder by heating the second mixture to a temperature of 300° C. to 500° C. at a heating rate of 2 to 5° C./min and maintaining the temperature for 10 to 24 h in a muffle furnace; or removing the binder by laser irradiation with a spot diameter of 10 mm to 15 mm under a laser power of 30 W or less for 5 min to 20 min.

In some embodiments of the present disclosure, irradiating or sintering is performed in at least one of vacuum, air, nitrogen, oxygen and argon. The laser spot is configured to cover a sample. Each of the first laser and the second laser includes a gas laser, a solid laser, a semiconductor diode laser, a fuel laser, a fiber laser, a free electron laser, or a diode-pumped solid laser.

In some embodiments of the present disclosure, the laser power is in a range of 30 W to 1500 W, preferably in a range of 60 W to 200 W.

In some embodiments of the present disclosure, the laser sintering time is in a range of 5 s to 20 min, preferably in a range of 30 s to 3 min.

In some embodiments of the present disclosure, irradiating or sintering is performed through laser with a wavelength of 900 to 1000 nm, preferably 980 nm.

In some embodiments of the present disclosure, the method further includes cooling the $AB_2O_4$ type ferrite powder or the infrared radiation ceramic material by room temperature cooling, liquid ammonia quenching or liquid nitrogen quenching.

In some embodiments of the present disclosure, the infrared radiation ceramic material has a particle size of 0.1 μm to 2 μm.

In some embodiments of the present disclosure, the crucible includes a copper crucible, an iron crucible, a ceramic crucible, or a corundum crucible.

In some embodiments of the present disclosure, the crucible is placed on a sample stage movable in at least one of x, y and z directions for continuous scanning sintering in a 3D printing mode.

REFERENCE NUMERALS

Figure 1:
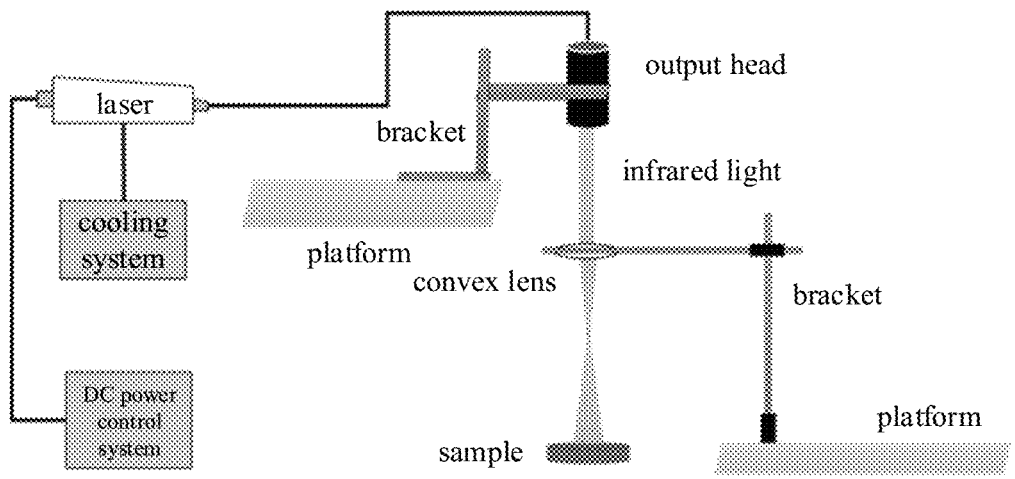
FIG. 1 is a schematic diagram showing a device for laser self-propagating sintering in some embodiments of the present disclosure.

1: $Mn^{2+}$; 2: $Fe^{2+}$; 3: $Cu^{2+}$; 4: ferrite; 5: excited ferrite; 6: ceramic composite material; 7: laser; 8: energy transfer; 9: reaction area; 10: cordierite; 11: excited cordierite.

DETAILED DESCRIPTION

Embodiments of the present disclosure are described in detail below, examples of which are illustrated in the drawings. The embodiments shall not be construed to limit the present disclosure.

It is found through researches that Cu atoms have a strong absorption peak in 980 nm band of infrared light. A laser self-propagating sintering method may make metals, such as a Cu source, a Fe source and an Mn source, and their oxides react together. The self-propagating sintering catalyzed by laser may cause energy level transition of $Cu^{2+}$ of the Cu source to an excited state, and the energy transfer between different atoms also occurs to perform energy level transition to realize laser self-propagating diffusion. That is, the energy transfers between Cu atoms, Fe atoms and Mn atoms occur to realize laser self-propagating sintering. On the one hand, the laser-excited Fe source, Mn source and Cu source have high energy by absorbing photons. On the other hand, the excited $Cu^{2+}$ has higher catalytic activity and higher synthesis efficiency. The atoms of the Fe source, the Mn source and the Cu source may recombine to form ferrite crystal nuclei, which may be excited by the laser to accumulate into composite ferrite crystallites, such as $CuMn_2O_4$, $CuFe_2O_4$ or $MnFe_2O_4$. Furthermore, the composite ferrite crystallites may be effectively compounded with the cordierite by laser self-propagating sintering to obtain the ceramic material with a high emissivity.

In an aspect, embodiments of the present disclosure provide a method for preparing an infrared radiation ceramic material. The method includes steps:

(1) Preparation of Spinel-Type Ferrite:

mixing and ball milling raw materials of $Fe_2O_3$, $MnO_2$ and CuO in a mass ratio of x:(9-y):y to obtain a mixed powder, where 0<x<9, and 0<y<9;

pressing the mixed powder;

irradiating or sintering by a first laser with a first irradiating parameter the pressed mixed powder in a first copper crucible for a high-temperature solid-phase reaction to obtain an $AB_2O_4$ type ferrite powder;

(2) Preparation of Infrared Radiation Ceramic Material:

obtaining a first mixture by mixing the $AB_2O_4$ type ferrite powder and a cordierite powder in a mass ratio of m:(100-m), where 0≤m≤100, and adding 0 to 5% of a sintering aid and a nucleating agent based on a total mass percent of the infrared radiation ceramic material for ball milling;

obtaining a second mixture by mixing the first mixture with 1% to 5% of a binder based on the total mass percent of the infrared radiation ceramic material for aging for 10 h or more;

pressing the second mixture;

irradiating or sintering by a second laser with a second irradiating parameter the pressed second mixture in a second copper crucible for a high-temperature solid-phase reaction to obtain the infrared radiation ceramic material.

In some embodiments of the present disclosure, each of the first irradiating parameter and the second irradiating parameter includes at least one of laser spot, laser power and laser sintering time.

In some embodiments of the present disclosure, in step (1), the method further includes drying the raw materials of $Fe_2O_3$, $MnO_2$ and CuO in a drying oven at a temperature of 75° C. to 85° C. for 2 h or more, before mixing and ball milling raw materials of $Fe_2O_3$, $MnO_2$ and CuO. The mass ratio of $Fe_2O_3$, $MnO_2$ and CuO is such that the mixed powder includes one or more of $MnFe_2O_4$, $CuFe_2O_4$, $CuMn_2O_4$, $FeFe_2O_4$ and $FeMn_2O_4$.

In some embodiments of the present disclosure, in step (1), mixing and ball milling raw materials of $Fe_2O_3$, $MnO_2$ and CuO in a mass ratio of x:(9-y):y to obtain the mixed powder includes:

dry ball milling the raw materials to obtain the mixed powder.

In alternative embodiments of the present disclosure, in step (1), mixing and ball milling raw materials of $Fe_2O_3$, $MnO_2$ and CuO in a mass ratio of x:(9-y):y to obtain the mixed powder includes:

wet ball milling the raw materials with anhydrous ethanol, n-heptane, acetone or deionized water as a medium for 5 h or more in a ball milling tank, wherein a volume of the raw materials is not more than two thirds of a volume of the ball milling tank;

drying the ball milled materials at a temperature of 75° C. to 85° C. for 3 h or more to obtain the mixed powder; and grinding the mixed powder evenly.

In some embodiments of the present disclosure, in steps (1) and (2), ball milling is performed by a ball mill at a milling speed of 300 to 600 r/min, and a mass ratio of a milling ball to powders is 10:1 to 60:1. The ball milling may be performed stepwise at different rotation rates.

In some embodiments of the present disclosure, in step (2), the binder includes one or more of polyvinyl alcohol, methyl cellulose, polyhedral silsesquioxane, water glass, W-6C powder molding glue, hyperborosilicate, methoxysilane, polyurethane and silicone. The W-6C powder molding glue is a powder molding adhesive with an epoxy resin as a main component. The binder also includes an organic substance with a certain bonding function.

In some embodiments of the present disclosure, each of the sintering aid and the nucleating agent includes one or more of $TiO_2$, TiC, ZnO, $CeO_2$, and $ZrO_2$. The mass ratio of the sintering aid to the nucleating agent is not particularly limited, provided that the sintering process and the nucleating process are smoothly performed. In some embodiments, the mass ratio of the sintering aid to the nucleating agent ranges from 1:2 to 5:1, preferably from 1:1 to 3:1.

In some embodiments of the present disclosure, in steps (1) and (2), pressing is performed by hydraulic pressing at a pressure of 2 MPa to 15 MPa for 3 s to 10 s, or by isostatic pressing at a pressure of 100 MPa to 300 MPa for 3 s to 10 s.

In some embodiments of the present disclosure, after the pressing, the method further includes:

removing the binder by heating the second mixture to a temperature of 300° C. to 500° C. at a heating rate of 2 to 5° C./min and maintaining the temperature for 10 to 24 h in a muffle furnace; or removing the binder by laser irradiation with a spot diameter of 10 mm to 15 mm under a laser power of 30 W or less for 5 min to 20 min.

In some embodiments of the present disclosure, in steps (1) and (2), irradiating or sintering is performed in at least one of vacuum, air, nitrogen, oxygen and argon. The laser spot is configured to cover a sample. Each of the first laser and the second laser includes a gas laser, a solid laser, a semiconductor diode laser, a fuel laser, a fiber laser, a free electron laser, or a diode-pumped solid laser.

In some embodiments of the present disclosure, the laser power is in a range of 30 W to 1500 W, preferably in a range of 60 W to 200 W.

In some embodiments of the present disclosure, the laser sintering time is in a range of 5 s to 20 min, preferably in a range of 5 s to 10 min, more preferably in a range of 30 s to 3 min.

In some embodiments of the present disclosure, irradiating or sintering is performed through laser with a wavelength of 900 to 1000 nm, preferably 980 nm.

In some embodiments of the present disclosure, in steps (1) and (2), after the sintering, the method further includes cooling the $AB_2O_4$ type ferrite powder or the infrared radiation ceramic material by rapid cooling such as room temperature cooling, or immediate cooling such as liquid ammonia quenching or liquid nitrogen quenching to achieve grain refinement.

In some embodiments of the present disclosure, the infrared radiation ceramic material has a particle size of 0.1 μm to 2 μm.

In some embodiments of the present disclosure, the crucible includes a copper crucible, an iron crucible, a ceramic crucible, or a corundum crucible.

In some embodiments of the present disclosure, the crucible is placed on a sample stage movable in at least one of x, y and z directions for continuous scanning sintering in a 3D printing mode.

Embodiments of the present disclosure provide a method for preparing an infrared radiation ceramic material by a laser self-propagating sintering process at a room temperature. The obtained infrared radiation ceramic material may obtain a high emissivity under sunlight. In embodiments of the present disclosure, $Fe_2O_3$, $MnO_2$ and CuO and cordierite ($2MgO \cdot 2Al_2O_3 \cdot 5SiO_2$) powders are used as raw materials, and $Co_2O_3$ is not doped, which may save a lot of raw material costs compared with other ceramic materials.

Embodiments of the present disclosure provide a method for preparing boron carbide and carbon powder material by laser sintering. The method includes the steps as follows.

Rare earth oxide powders are added to and mixed with powders of reaction raw materials. The rare earth ions may absorb a part of the laser energy to realize energy transfer and cascade reaction of the raw materials.

The mixed rare earth oxide raw materials are uniformly mixed by high-energy ball milling to obtain uniformly mixed powders, and then the uniformly mixed powders are pressed by a press to form a flake. The flake is fixed on a laser platform for laser sintering to excite rare earth sensitized ions by laser resonance to achieve energy transfer, such that laser energy may be supplied continuously. The excited ions may be re-excited and subjected to multi-step cascade reaction to transfer energy, thereby inducing the mixed raw materials to undergo a high-temperature solid-phase reaction to generate boron carbide.

Preferably, the rare earth oxide powders include oxides of 15 kinds of lanthanide elements, and oxides of scandium (Sc), yttrium (Y) with similar chemical properties to lanthanide elements, i.e. oxides of 17 kinds of elements in total. The rare earth oxide powders may be used for the high-temperature solid-phase reaction of the reaction raw materials to generate boron carbide components.

Preferably, the reaction raw materials include a boron source and a carbon source. The boron source includes but is not limited to boric acid ($H_3BO_3$), or boron oxide ($B_2O_3$), and the carbon source includes but is not limited to graphite powders, sucrose, glucose, or graphene sheets. The high-energy ball milling is performed in a polyurethane ball milling tank at a ball milling speed in a range of 300 to 400 rpm for 8 to 36 h, using anhydrous ethanol, acetone or deionized water as a medium. After ball milling, the milled raw materials are dried in a blast drying oven and ground into powders having a particle size of 45 μm to 150 μm to facilitate the final formation of the high-purity boron carbide.

Preferably, the mixed rare earth oxide raw materials may be granulated according to actual needs to have small microscopic particle size and high density. The granulation process is as follows. An organic colloidal material such as polyvinyl alcohol (PVA) is used as a binder solute, and deionized water is used as a solvent. The binder solute and the solvent are mixed by a magnetic stirrer to prepare a binder solution with a mass fraction of 1%. The binder solution is added into the uniformly mixed powders at a mass ratio of 1:1 to obtain a mixture. The mixture is milled for 4 h, and then is granulated and sieved by a screen with 100 to 325 meshes. The sieved powders are pressed into flakes by a press, and then are irradiated by laser to remove the binder, thereby further improving the purity of the boron carbide. The binder may also be removed by other methods such as heating via a tube furnace.

Preferably, the binder solute includes but is not limited to PVA, methoxysilane, polyurethane and silicone.

Preferably, the mixed powders to be sintered may be in the form of flakes which are pressed by a powder press, or in the form of powders which are fed synchronously.

Preferably, the laser sintering may be performed in at least one of vacuum, air, nitrogen, oxygen or argon. The size of the laser spot may be adjusted according to the size of a sample. The sensitizing ions may perform energy resonance absorption under laser to transfer energy to reactants. The laser may include a gas laser, a solid laser, a semiconductor diode laser, a fuel laser, a fiber laser, a free electron laser or a diode-pumped solid-state laser, and has a laser power of 100 W to 3000 W.

The prepared infrared radiation ceramic material has a stable structure, a fine grain size, a low thermal expansion coefficient, and a high infrared radiation performance at room temperature. The laser sintering process has simple process flow, low cost, high efficiency, environmental protection, no pollution, and low energy consumption, and is suitable for large-scale industrial application.

Figure 2:
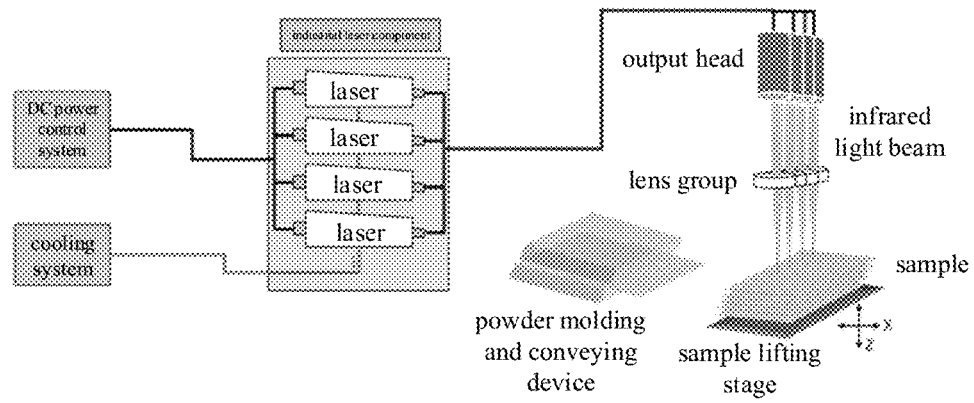
FIG. 2 is a schematic diagram showing an industrial device for laser self-propagating sintering in some embodiments of the present disclosure.

FIG. 1 is a schematic diagram showing a device for a laser self-propagating sintering. As shown in FIG. 1, a direct current (DC) power control system and a cooling system are configured to control a laser to emit infrared laser light. The infrared laser is introduced into an output head through an optical fiber to form a stable output light source, which may radiate on a surface of a sample. A distance between a lens and a sample platform may be adjusted to control the spot size to obtain different laser energy. A current and a voltage of the DC power source may be adjusted to excite the infrared laser energy under different power conditions. At the same time, a sintering time of the raw materials is controlled to prepare desired materials. In addition, FIG. 2 is a schematic diagram showing an industrial device for a laser self-propagating sintering. A plurality of laser output heads of the industrial device are arranged side by side, and samples may be printed layer by layer through a sample conveying device, which improves the work efficiency and saves the cost.

In embodiments of the present disclosure, the raw materials of $Fe_2O_3$, $MnO_2$ and CuO powders are used, and each of the powders has a purity higher than 96 wt %, and a coarse powder particle size less than 300 meshes. The cordierite powder has an industrial-grade purity and a particle size less than 300 meshes. Due to a strong absorption peak of Cu atoms in 980 nm band, the laser is an infrared continuous laser in 980 nm band. The laser self-propagating sintering method may make metals, such as a Cu source, a Fe source and an Mn source, and their oxides react together.

Figure 3:
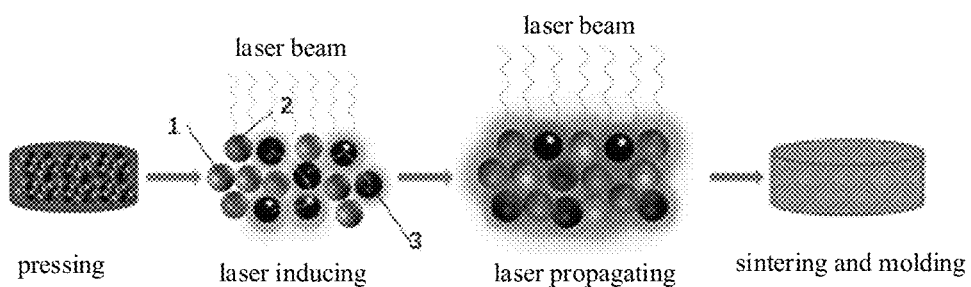
FIG. 3 is a schematic diagram showing a laser self-propagating sintering process of $AB_2O_4$ type ferrite in some embodiments of the present disclosure.

FIG. 3 is a schematic diagram showing a laser self-propagating sintering process of $AB_2O_4$ type ferrite in some embodiments of the present disclosure. The 980 nm laser after passing through the lens may just cover the produced tablet of the raw material powders of $Fe_2O_3$, $MnO_2$ and CuO. The Cu source absorbs the infrared laser effectively, such that $Cu^{2+}$ of the Cu source is subjected to energy level transition to an excited state, and energy transfer between different atoms also occurs to perform energy level transition such that other atoms also reach their respective excited states, thereby realizing laser self-propagating sintering. During the reaction, $AB_2O_4$ type ferrite is formed, and is used for the self-propagating sintering reaction after mixing with the cordierite powders and pressing. The obtained $AB_2O_4$ type ferrite may still be regarded as a Cu source, which may effectively absorb the 980 nm laser.

Figure 4:
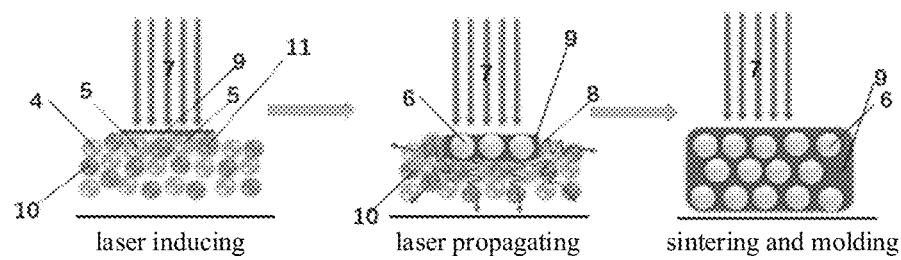
FIG. 4 is a schematic diagram showing a laser self-propagating sintering process of an infrared radiation ceramic material prepared from $AB_2O_4$ type ferrite and cordierite in some embodiments of the present disclosure.

FIG. 4 is a schematic diagram showing a laser self-propagating sintering process of an infrared radiation ceramic material prepared from $AB_2O_4$ type ferrite and cordierite. As shown in FIG. 4, the 980 nm laser after passing through the lens may just cover a tablet of the $AB_2O_4$ type ferrite powder and the cordierite powder. The Cu source in the $AB_2O_4$ type ferrite powder effectively absorbs laser to reach an excited state, and then energy is transferred to the surrounding cordierite powder for reaction to form a ceramic composite material.

The method provided in embodiments of the present disclosure has short preparation time, low energy consumption, simple operation process and low cost of raw materials. The obtained infrared radiation ceramic material has a low expansion coefficient and a high room-temperature infrared emissivity, which may be used for various fields, such as food preservation, aerospace, catalytic purification and medical care.

Example 1

Raw materials of $Fe_2O_3$, $MnO_2$ and CuO were mixed in a mass ratio of 6:6:3 to obtain a mixture. The mixture was ball milled with deionized water as a medium at a milling speed of 400 r/min for 5 h or more, preferably 6 h to 10 h. The ball milled materials were dried in a drying oven at a temperature of 80° C. for 10 h. The dried mixed powder was compacted and molded by a hydraulic press at a pressure of 15 MPa for 10 s to obtain a first tablet. The first tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture in the first tablet to obtain an $AB_2O_4$ type ferrite powder.

The $AB_2O_4$ type ferrite powder and a cordierite powder were mixed in a mass ratio of 10:90, and 0 to 5%, preferably 2 to 3% of a sintering aid and a nucleating agent based on a total mass percent of the infrared radiation ceramic material were added to obtain a first mixture. The first mixture is dry ball milled at a milling speed of 400 r/min for 5 h or more, preferably 6 h to 10 h to obtain the ball milled powder. After ball milling, 1% to 5%, preferably 2% to 3% of a binder based on the total mass percent of the infrared radiation ceramic material was added to the ball milled powder for aging for 10 h or more, preferably 15 h to 20 h to obtain a second mixture. The second mixture was compacted and molded by a hydraulic press at a pressure of 15 MPa for 10 s to obtain a second tablet. The second tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture to obtain a room-temperature infrared radiation ceramic material.

Example 2

Raw materials of $Fe_2O_3$, $MnO_2$ and CuO were mixed in a mass ratio of 6:6:3 to obtain a mixture. The mixture was ball milled with deionized water as a medium at a milling speed of 400 r/min for 5 h or more, preferably 6 h to 10 h. The ball milled materials were dried in a drying oven at a temperature of 80° C. for 10 h. The dried mixed powder was compacted and molded by a hydraulic press at a pressure of 15 MPa for 10 s to obtain a first tablet. The first tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture in the first tablet to obtain an $AB_2O_4$ type ferrite powder.

The $AB_2O_4$ type ferrite powder and a cordierite powder were mixed in a mass ratio of 20:80, and 0 to 5%, preferably 2 to 3% of a sintering aid and a nucleating agent based on a total mass percent of the infrared radiation ceramic material were added to obtain a first mixture. The first mixture is dry ball milled at a milling speed of 500 r/min for 5 h or more, preferably 6 h to 10 h to obtain the ball milled powder. After ball milling, 1% to 5%, preferably 2% to 3% of a binder based on the total mass percent of the infrared radiation ceramic material was added to the ball milled powder for aging for 10 h or more, preferably 15 h to 20 h to obtain a second mixture. The second mixture was compacted and molded by a hydraulic press at a pressure of 15 MPa for 10 s to obtain a second tablet. The second tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture to obtain a room-temperature infrared radiation ceramic material.

Example 3

Raw materials of $Fe_2O_3$, $MnO_2$ and CuO were mixed in a mass ratio of 6:6:3 to obtain a mixture. The mixture was ball milled with deionized water as a medium at a milling speed of 400 r/min for 5 h or more, preferably 6 h to 10 h. The ball milled materials were dried in a drying oven at a temperature of 80° C. for 10 h. The dried mixed powder was compacted and molded by a hydraulic press at a pressure of 15 MPa for 10 s to obtain a first tablet. The first tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture in the first tablet to obtain an $AB_2O_4$ type ferrite powder.

The $AB_2O_4$ type ferrite powder and a cordierite powder were mixed in a mass ratio of 25:75, and 0 to 5%, preferably 2 to 3% of a sintering aid and a nucleating agent based on a total mass percent of the infrared radiation ceramic material were added to obtain a first mixture. The first mixture is dry ball milled at a milling speed of 600 r/min for 5 h or more, preferably 6 h to 10 h to obtain the ball milled powder. After ball milling, 1% to 5%, preferably 2% to 3% of a binder based on the total mass percent of the infrared radiation ceramic material was added to the ball milled powder for aging for 10 h or more, preferably 15 h to 20 h to obtain a second mixture. The second mixture was compacted and molded by a hydraulic press at a pressure of 15 MPa for 10 s to obtain a second tablet. The second tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture to obtain a room-temperature infrared radiation ceramic material.

Example 4

Raw materials of $Fe_2O_3$, $MnO_2$ and CuO were mixed in a mass ratio of 6:6:3 to obtain a mixture. The mixture was ball milled with deionized water as a medium at a milling speed of 400 r/min for 5 h or more, preferably 6 h to 10 h. The ball milled materials were dried in a drying oven at a temperature of 80° C. for 10 h. The dried mixed powder was compacted and molded by a hydraulic press at a pressure of 15 MPa for 10 s to obtain a first tablet. The first tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture in the first tablet to obtain an $AB_2O_4$ type ferrite powder.

The $AB_2O_4$ type ferrite powder and a cordierite powder were mixed in a mass ratio of 30:70, and 0 to 5%, preferably 2 to 3% of a sintering aid and a nucleating agent based on a total mass percent of the infrared radiation ceramic material were added to obtain a first mixture. The first mixture is dry ball milled for 5 h or more, at a milling speed of 400 r/min for 2 h to 3 h, and then at a milling speed of 600 r/min for 4 h to 7 h to obtain the ball milled powder. After ball milling, 1% to 5%, preferably 2% to 3% of a binder based on the total mass percent of the infrared radiation ceramic material was added to the ball milled powder for aging for 10 h or more, preferably 15 h to 20 h to obtain a second mixture. The second mixture was compacted and molded by a hydraulic press at a pressure of 15 MPa for 10 s to obtain a second tablet. The second tablet was placed in a copper crucible, and then was sintered by a fiber laser with a laser wavelength of 980 nm, a laser power of 30 W to 1500 W, preferably 60 W to 200 W, and a laser sintering time of 5 s to 10 min, preferably 30 s to 3 min, so as to cause a high-temperature solid-phase reaction of the mixture to obtain a room-temperature infrared radiation ceramic material.

Although explanatory embodiments have been shown and described, it would be appreciated by those skilled in the art that the above embodiments cannot be construed to limit the present disclosure, and changes, alternatives, and modifications can be made in the embodiments without departing from the spirit, principle and scope of the present disclosure.

What is claimed is:

1. A method for preparing an infrared radiation ceramic material, comprising: mixing and ball milling raw materials of $Fe_2O_3$, $MnO_2$ and CuO in a mass ratio of x:(9-y):y to obtain a mixed powder, where $0<x<9$, and $0<y<9$; pressing the mixed powder; irradiating or sintering by a first laser with a first irradiating parameter the pressed mixed powder in a first crucible for a solid-phase reaction to obtain an $AB_2O_4$ type ferrite powder; obtaining a first mixture by mixing the $AB_2O_4$ type ferrite powder and a cordierite powder in a mass ratio of m:(100-m), where 0<m<100, and adding 0 to 5% of each of a sintering aid and a nucleating agent based on a total mass percent of the raw materials material for ball milling; obtaining a second mixture by mixing the first mixture with 1% to 5% of a binder based on the total mass percent of the raw materials and aging for 10 h or more; pressing the second mixture; and irradiating or sintering by a second laser with a second irradiating parameter the pressed second mixture in a second copper crucible for a solid-phase reaction to obtain the infrared radiation ceramic material, wherein each of the first irradiating parameter and the second irradiating parameter comprises at least one of laser spot, laser power and laser sintering time.

2. The method according to claim 1, further comprising:
drying the raw materials of $Fe_2O_3$, $MnO_2$ and CuO at a temperature of 75° C. to 85° C. for 2 h or more,
wherein the mass ratio of $Fe_2O_3$, $MnO_2$ and CuO is such that the mixed powder comprises one or more of $MnFe_2O_4$, $CuFe_2O_4$, $CuMn_2O_4$, $FeFe_2O_4$ and $FeMn_2O_4$.

3. The method according to claim 1, wherein mixing and ball milling raw materials of $Fe_2O_3$, $MnO_2$ and CuO in a mass ratio of x:(9-y):y to obtain the mixed powder comprises:
dry ball milling the raw materials to obtain the mixed powder.

4. The method according to claim 1, wherein mixing and ball milling raw materials of $Fe_2O_3$, $MnO_2$ and CuO in a mass ratio of x:(9-y):y to obtain the mixed powder comprises:
wet ball milling the raw materials with anhydrous ethanol, n-heptane, acetone or deionized water as a medium for 5 h or more in a ball milling tank, wherein a volume of the raw materials is not more than two thirds of a volume of the ball milling tank;
drying the ball milled materials at a temperature of 75° C. to 85° C. for 3 h or more to obtain the mixed powder; and
grinding the mixed powder evenly.

5. The method according to claim 1, wherein ball milling is performed by a ball mill at a milling speed of 300 to 600 r/min, and a mass ratio of a milling ball to powders is 10:1 to 60:1.

6. The method according to claim 1, wherein the binder comprises one or more of polyvinyl alcohol, methyl cellulose, polyhedral silsesquioxane, water glass, W-6C powder molding glue, hyperborosilicate, methoxysilane, polyurethane and silicone.

7. The method according to claim 1, wherein each of the sintering aid and the nucleating agent comprises one or more of $TiO_2$, TiC, ZnO, $CeO_2$, and $ZrO_2$.

8. The method according to claim 1, wherein pressing is performed by hydraulic pressing at a pressure of 2 MPa to 15 MPa for 3 s to 10 s, or by isostatic pressing at a pressure of 100 MPa to 300 MPa for 3 s to 10 s.

9. The method according to claim 1, further comprising:
removing the binder by heating the second mixture to a temperature of 300° C. to 500° C. at a heating rate of 2 to 5° C./min and maintaining the temperature for 10 to 24 h in a muffle furnace; or
removing the binder by laser irradiation with a spot diameter of 10 mm to 15 mm under a laser power of 30 W or less for 5 min to 20 min.

10. The method according to claim 1, wherein irradiating and sintering is performed in at least one of vacuum, air, nitrogen, oxygen and argon;
wherein the laser spot is configured to cover a sample; and
wherein each of the first laser and second laser comprises a gas laser, a solid laser, a semiconductor diode laser, a fuel laser, a fiber laser, a free electron laser, or a diode-pumped solid laser.

11. The method according to claim 1, wherein each of the first laser and the second laser power is in a range of 30 W to 1500 W).

12. The method according to claim 11, wherein each of the first laser and the second laser power is in a range of 60 W to 200 W).

13. The method according to claim 1, wherein each of the first laser and the second laser sintering time is in a range of 5 s to 20 min).

14. The method according to claim 13, wherein each of the first laser and the second laser sintering time is in a range of 30 s to 3 min.

15. The method according to claim 1, wherein irradiating or sintering is performed through laser with a wavelength of 900 to 1000 nm.

16. The method according to claim 15, wherein irradiating or sintering is performed through laser with a wavelength of 980 nm.

17. The method according to claim 1, further comprising:
cooling the $AB_2O_4$ type ferrite powder or the infrared radiation ceramic material by room temperature cooling, liquid ammonia quenching or liquid nitrogen quenching.

18. The method according to claim 1, wherein the infrared radiation ceramic material has a particle size of 0.1 μm to 2 μm.

19. The method according to claim 1, wherein the first crucible comprises a copper crucible, an iron crucible, a ceramic crucible, or a corundum crucible.

20. The method according to claim 1, wherein the first crucible is placed on a sample stage movable in at least one of x, y and z directions for continuous scanning sintering in a 3D printing mode.

* * * * *